Jan. 16, 1968 D. L. MacADAM 3,364,497

RECORDING OF DIGITAL DATA

Filed May 18, 1966

DAVID L. MacADAM
INVENTOR.

BY Robert F. Crocker
Daniel E. Sragow
ATTORNEY & AGENT

1

3,364,497
RECORDING OF DIGITAL DATA
David L. MacAdam, Rochester, N.Y., assignor to Eastman Kodak Company, Rochester, N.Y., a corporation of New Jersey
Filed May 18, 1966, Ser. No. 551,055
3 Claims. (Cl. 346—108)

ABSTRACT OF THE DISCLOSURE

Apparatus for recording digital data in the form of a plurality of superimposed but distinct single frequency diffraction gratings formed by interference patterns between reference and "digit" beams derived from a laser source. A plurality of individual mirrors moved by piezo-electric units are used to control selectively the "digit" beams.

This invention relates to information storage and retrieval systems, and particularly to a method of digital data recording in which superimposed grating patterns are exposed onto a photographic film.

With digital computers getting larger and demanding greater information storage capacity, there has arisen a need for an information storage medium which takes a minimum amount of space. A conventional method of storing binary digital information has been on punched cards. Each presence or absence of a hole in the card is indicative of a binary bit. When it is attempted to place more holes in a punched card in order to store more information, the card becomes very fragile and even so does not have the desired large capacity.

Digital information has also been stored on photographic film with dark spots being indicative of binary bits. This has allowed greater storage capacity than punched cards because of the great resolving power of photographic film but has several disadvantages. First, as the dots on the film are made smaller in order to increase the information storage per unit area on the film, the accuracy with which the film has to be positioned increases. Furthermore, as the dots are made smaller, the read out device has increasing difficulty in distinguishing between a dot and a speck of dirt, and between a scratch and a blank space. Another prior art system of storing digital information on photographic film uses diffraction gratings instead of dots and blanks. In this type of system a diffraction grating of one frequency is used to represent a binary 1, and a diffraction grating of another frequency is used to represent a binary 0. The diffraction gratings are recorded on film. When it is desired to read out the recorded information, monochromatic light is directed through the recorded gratings, and the first order images from the gratings are detected to determine which bit has been recorded. This system helps to reduce the problem of distinguishing between scratches and dust, and information, but it does not increase the information capacity of the film since the film area required to record each bit is substantially the same as before, and extremely accurate record positioning is still required.

In U. S. Patent 3,312,955 issued on Apr. 4, 1967, to R. L. Lamberts and G. C. Higgins, there is disclosed a method and apparatus for recording binary information on film as superimposed diffraction gratings, each grating

2 corresponding to a binary bit. This type of record has the additional advantage of being able to more fully utilize the resolving power of the film, i.e., it permits more information to be stored per unit area. This is brought about because in the same area of the film previously used for one binary bit there is now recorded several binary bits. There is no need for increased accuracy of the positioning mechanism, since the total information in the superimposed gratings is spread throughout the whole space occupied by the gratings.

It is an object of this invention to provide new methods and apparatus for recording superimposed diffraction gratings. This object is realized by providing a source of coherent radiation, and a series of mirrors, each mirror intercepting a portion of said radiation and reflecting it to a common area where the interference pattern is formed, and exposing a photosensitive member to said interference pattern to form a composite diffraction grating.

Other objects of the invention will appear from the following description, reference being made to the following drawing wherein.

Figures 1, 2:
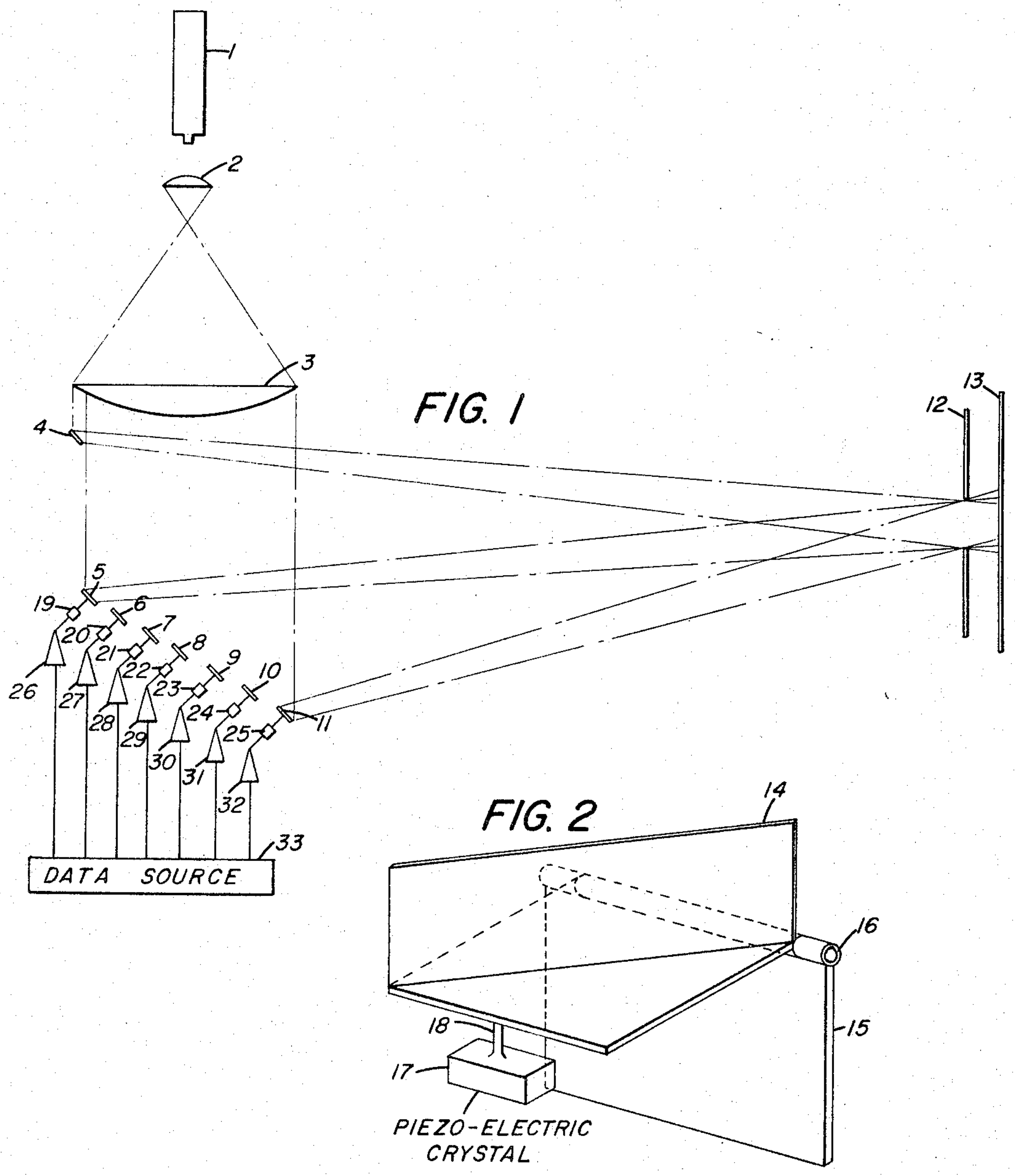
FIGURE 1 shows schematically an apparatus according to the invention.
FIGURE 2 shows a mechanism for turning the mirror in order to deflect the reflected radiation.

Referring to FIGURE 1 there is shown schematically a gas laser 1 whose beam is enlarged in a horizontal direction by cylindrical lens 2 and then collimated into a beam which is wide in the width of the drawing but which is narrow in a direction perpendicular to the drawing.

The widened collimated beam impinges on mirrors 4 to 11, which are spaced so as to conjointly intercept substantially all of the beam. Each of the mirrors 4 to 11 is positioned so that light from the laser will be reflected through diaphragm 12 onto the same predetermined area of photosensitive member 13, preferably a photographic film. Since the light beams from mirrors 5 to 11 each form an angle with the light from mirror 4, a distinct interference pattern will be formed at member 13 for each of the beams from mirrors 5 to 11. Since the angle that each of mirrors 5 to 11 makes with the beam from mirror 4 is different, a composite pattern of seven different interference patterns effectively superimposed one upon another will appear. If photosensitive member 13 is exposed to this composite interference pattern, a composite diffraction grating pattern including seven superimposed but distinct single frequency gratings will be formed on the photosensitive member. If it is desired to magnify or demagnify the interference pattern, appropriate lenses can be used between the mirrors and the photosensitive member.

As shown in the above mentioned copending application, it is desirable to keep the frequencies of the composite diffraction grating within an octave. According to principles of physical optics the spatial frequency of the interference pattern in cycles per mm. (i.e., the number of lines per mm.) will be given by the equation $$f=\frac{\sin\theta}{\lambda}$$

where $\lambda$ is the wavelength of the light in mm., and $\theta$ is the angle between the two interfering beams. If a He-Ne laser operating at 6328 A. is used as the source, and it is desired to record spatial frequencies of 70, 80, 90, 100, 110, 120, and 130 lines per mm., mirror 4 can be fixed rigidly at, for example, an angle of 46.173° with respect to the collimated rays. Mirrors 5 to 11 would then be at the following angles with respect to the collimated rays:

| Mirror: | Angle, degrees |
|---|---|
| **5** | 44.910 |
| **6** | 44.729 |
| **7** | 44.548 |
| **8** | 44.367 |
| **9** | 44.186 |
| **10** | 44.005 |
| **11** | 43.824 |

As described the device will produce a composite of seven interference patterns. Of course, the light beams from mirrors 5 to 11 will interfere with each other, but their included angles are so small that the interfering frequencies are too low to be significant.

If it is desired to eliminate any one of the seven spatial frequencies, it is only necessary to rotate the corresponding mirror, any one of 5 to 11, through a small angle so that the light reflected by that mirror is masked by diaphragm 12. One apparatus for rotating the mirror is shown in FIGURE 2. Mirror 14 is mounted on support 15 so that it is free to rotate at bearings 16. Rigidly mounted on support 15 is piezoelectric crystals 17 which is coupled to the mirror by linkage 18. When the piezoelectric crystal is energized, the mirror 14 is rotated on its bearings 16 and thus deflects the beam.

The axis of rotation of the mirror should be perpendicular to the beam reflected by the mirror in order to minimize any error in spatial frequency due to hysteresis in the action of the mirror and actuator system.

All of the mirrors 5 to 11 are mounted as shown in FIGURE 2. As shown in FIGURE 1 mirrors 5 to 11 are driven by piezoelectric crystals 19 to 25 respectively, which in turn are driven by drive amplifiers 26 to 32. The trigger signals for the drive amplifiers are derived from data source 33.

If all of mirrors 5 to 11 are mounted in the manner shown in FIGURE 2, each can be selectively rotated in order to select the frequency or frequencies to be recorded. Of course, if it is desired to record in discrete areas, mirror 4 can also be similarly mounted, so that when desired all light can be cut off from the photosensitive member.

Instead of piezoelectric actuation for the mirrors, electromagnetic or mechanical actuators could be used. Although a laser has been found to be a satisfactory light source, any source of coherent light could be used.

While the invention has been described with reference to certain embodiments, it is understood that various changes could be made by persons skilled in the art without departing from the spirit of the invention. The invention is therefore to be limited only by the scope of the appended claims.

I claim:

1. In apparatus for producing a composite diffraction grating pattern on a radiation-sensitive recording medium located at a predetermined position relative to said apparatus, said apparatus including a plurality of beam directing means for directing, respectively, a reference beam and a plurality of data beams of effectively coherent radiation along respective unique intersecting paths to form a composite interference pattern at said position, the interference of each said data beam and said reference beam producing a respective line grating pattern of individually-distinct spacial frequency and said composite pattern comprising the resulting plurality of said line gratings effectively superimposed one upon another, the improvement comprising:

at least one said data beam directing means including a movable beam directing element, and control means for selectively moving said beam directing element to alter the path of its respective data beam relative to the reference beam at said predetermined position, thereby altering the interference pattern formed at said position to change the composition of said composite diffraction grating pattern.

2. The apparatus according to claim 1 wherein said control means includes selectively energizable piezoelectric means for moving said beam directing element.

3. The apparatus according to claim 1 wherein said movable beam directing element is a mirror.

References Cited

UNITED STATES PATENTS

| | | | |
|---|---|---|---|
| 3,256,524 | 6/1966 | Stauffer | 346—76 |
| 3,312,955 | 4/1967 | Lambert et al. | 340—173 |

RICHARD B. WILKINSON, *Primary Examiner.*

J. W. HARTARY, *Assistant Examiner.*